UNITED STATES PATENT OFFICE.

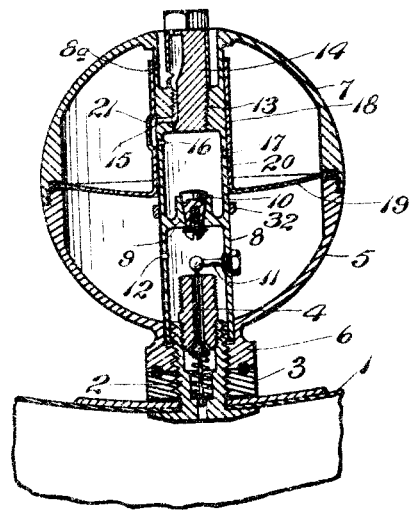

CHARLES E. JOHNSON, OF GRAND RAPIDS, MICHIGAN.

ALARM FOR PNEUMATIC TIRES.

1,187,150. Specification of Letters Patent. Patented June 13, 1916.

Application filed January 18, 1915. Serial No. 2,908.

*To all whom it may concern:*

Be it known that I, CHARLES E. JOHNSON, a citizen of the United States of America, residing at Grand Rapids, in the county of Kent and State of Michigan, have invented certain new and useful Improvements in Alarms for Pneumatic Tires; and I do hereby declare the following to be a full, clear, and exact description of the invention, such as will enable others skilled in the art to which it appertains to make and use the same.

This invention relates to an alarm for pneumatic tires.

The object and purpose of the invention is to provide a device of this character which may be attached to the valve stem of a pneumatic tire and used with any tire irrespective of the degree of the pressure to which it is inflated, the device acting when the pressure of the tire reduces below this initial pressure which it had when the device was attached, to sound an alarm, calling attention to the fact of pressure reduction.

It is a further object of the invention to provide an alarm which will act continuously for a time, will then stop and later repeat the alarm with reference to a new pressure in the air tube.

Further objects and purposes consisting in novel constructions and arrangements of parts to form a compact, easily manufactured and assembled device will be apparent upon understanding of the embodiment shown in the accompanying drawings, in which;

Figure 1 is a side elevation of the alarm. Fig. 2 is a vertical section taken centrally thereof and showing the parts in one position with the alarm not sounding. Fig. 3 is a view similar to Fig. 2 showing the position of the parts when the alarm is sounding. Fig. 4 is a sectional view of the whistle used. Fig. 5 is a vertical sectional view taken centrally of a modified construction; and Fig. 6 is a horizontal section on the line 6—6 of Fig. 5.

Similar reference numerals refer to similar parts throughout the several views of the drawing.

A section of an air tube is shown at 1 which carries a valve stem 2 secured by means of the nut 3 to the tube and which is equipped with the usual spring operated valve pin 4, the depression of which permits the escape of air from the air tube. In the embodiment illustrated in Figs. 1 to 3 inclusive, a semi-spherical member 5 equipped with an integral nut 6 is screwed on to the valve stem, while a similar member 7 threads on to the casing 5 to complete the housing of the alarm and the mechanism which operates it. A tube 8 is formed integrally with or securely attached in any suitable manner to the upper part 7 and is positioned vertically, and its lower end may lie around the upper part of the valve stem 4. A partition 9 is formed in the tube and provided with a conical valve seat to receive the conical valve 10 and, at a distance below this valve, a finger 11 attached to one side of the tube extends inwardly at its end bearing upon the valve pin 4. When the housing is attached to the valve stem the finger depresses pin 4 and permits the escape of air from the tube.

An opening 12 is made in the tube 8 below the partition 9 while above this partition the tube is closed by the comparatively thick cross member 13 in which is threaded a whistle 14, there being an opening 15 leading from one side of the member 13 and through the tube 8 to the whistle. Openings 16 and 17 are made in the tube 8 below the cross member 13, the opening 16 lying in the same vertical plane with opening 15. Also an opening 8ª is formed in tube 8 above cross member 13 as shown. It will be noted that a portion of the upper casing 7 is removed at the end of the tube 8 and that the whistle 14 is located in this opening.

A sleeve 18 is slidably mounted on the upper half of the tube 8, its upper end normally covering opening 8ª, its lower end being connected with a diaphragm 19 circular in outline the edges of which are received between the members 5 and 7, the diaphragm thus forming an air tight partition between the upper and lower halves of the housing. Sleeve 18 has an opening 20 normally registering with the opening 17 in tube 8 and is furthermore provided with a section 21 pressed outwardly to form a passageway between the sleeve and tube 8 which, as shown in Fig. 2, normally communicates with the upper opening 15 but terminates short of the opening 16.

After the tube 1 has been inflated the device is attached to the valve stem 2 whereupon air is released from the air tube passing through opening 12 and filling the lower half of the housing with air at a pressure equal to that within the tube. The valve 10 is raised by the pressure of the air permitting it to enter above the partition 9 and through openings 17 and 20 filling the upper half of the housing also with air until the pressure is equal to that in the lower half and in the tube 1 whereupon the valve 10 will return and cut off communication between the upper and lower halves of the housing. Suppose now the pressure in the tire reduces. It will be evident that the pressure in the lower half of the housing will also reduce correspondingly while the pressure in the upper half of the housing remains equal to the initial pressure at which the tire was inflated. This inequality of pressure causes the diaphragm 19 to be forced downwardly as shown in Fig. 3, moving sleeve 18 until openings 17 and 20 do not register while the section 21 will be carried below the opening 16 and a passageway formed through opening 16, under section 21 and opening 15 to the whistle 14, a free passage of air from the tire being made through valve 10 to the whistle which will sound continuously thereafter for a time or until the opening at 15 is closed, by reason of the downward movement of the sleeve 18 owing to the continually increasing difference in the pressure of the air in the upper and lower halves of the housing. When this opening is closed the opening 8ª will be uncovered and air from the upper half of the housing may escape to the outside permitting the return of sleeve 18 and diaphragm 19 to initial position whereupon the action of the device will be repeated the same as when it was first applied to the casing. It is of course evident that if the owner or operator of a vehicle equipped with pneumatic tires hears the first alarm he will attend to the inflation of the tire, but if he should be absent the tire will not completely deflate, the mechanism merely restoring to its first position with the tire inflated at lower pressure, and sounding the alarm when the pressure again reduces sufficiently.

It is apparent that if the initial pressure in the tube is a certain amount the reduction will have to be appreciable before the diaphragm will be depressed sufficiently for the whistle to act, the alarm therefore permitting a certain reduction in pressure from initial pressure before it acts.

The modification shown in Fig. 5 includes the tube, valve stem, nut and valve pin similar to that shown in Figs. 2 and 3 and has a lock nut 22 on which is threaded a substantially cylindrical casing 23 as shown, which at its upper end has a depending sleeve 24 reaching substantially half way from the top of the casing to the nut 22. Sleeve 24 performs a function analogous to sleeve 18 and is provided with a cross member 13ª, a whistle 14ª attached thereto, openings 15ª, 16ª 17ª and 8ª, similar to openings 15, 16, 17 and 8ª, in sleeve 18 as shown. A sleeve 25 analogous to sleeve 18 is loosely mounted on the tube 24 and has an opening 20ª registering with opening 17ª and a section 21ª similar to section 21 and similarly located with reference to openings 15ª and 16ª at its lower end carrying a piston 26 in place of the diaphragm 19. The piston fits closely within the housing 23 and has an opening through the center in the lower part of which is threaded a nut 27 provided with a valve seat in which is carried a ball valve 28 normally held in place by a thin spring 29. The nut 27 has a central opening closed by the ball and also carries a downwardly projecting pin 30 which engages with the end of the valve pin 4 to depress it when the device is attached to the valve stem. A coil spring 31 is interposed between the nut 27 and the lock nut 4 and is strong enough merely to hold the cylinder 26 and sleeve 25 in upper position as shown in Fig. 4. The operation in this construction is practically identical with that in the first construction, the only difference being that the cylinder will move downwardly when the pressure in the upper part of the housing exceeds that in the lower part, the operation of the whistle being identical and the repetition of the alarm being the same. Spring 29 is very weak sufficient only to retain the ball against outward movement during the revolution of the tire or when the valve is extending downwardly from the tire.

The tube 8, may if desired, be provided with a stop 32 to prevent the downward movement of sleeve 18 beyond a certain point and in a similar manner the nut 22 may be provided with upwardly projecting stop rods 32ª to stop the downward movement of the piston 26.

Various other modifications in construction may be resorted to without departing from the invention.

Without limiting myself to details of construction, I claim:

1. An alarm for pneumatic tires comprised of a housing, a movable member dividing the housing into upper and lower chambers, a tube extending downwardly from the upper portion of the housing, a sleeve mounted on the tube and connected to the movable member, a whistle in the tube, and air passages through the sleeve and tube normally in alinement but out of alinement on movement of the sleeve with respect to the tube, substantially as described.

2. An alarm for pneumatic tires comprised of a housing adapted to be secured to a valve stem, an open tube carried by and extending downwardly from the housing, said tube having two openings therein permitting the passage of air, a cross member in the tube above the openings having a transverse opening therein, a whistle carried by the cross member communicating with the opening, a sleeve provided with an opening normally in alinement with one of the openings in the tube and with an outwardly pressed section immediately above the other opening and over the opening in the transverse member slidably mounted on the tube, a member connected to the sleeve dividing the housing into upper and lower air tight compartments and a valve in the tube below the openings therein, substantially as described.

3. An alarm for pneumatic tires comprised of a housing, a member dividing the housing into upper and lower air tight compartments, a tube extending through the upper compartment, a sleeve slidably mounted on the tube, a whistle in the tube, means for securing the housing to the valve stem of an air tube, means to release air from the tube into the housing when it is attached, a valve permitting the passage of air from the lower to the upper chamber, but preventing its return, passages for air from the tube through the whistle becoming operative when the pressure in the upper compartment becomes greater than in the lower compartment moving the sleeve on the tube, and means to reduce the pressure in the upper compartment and stop the passage of air through the whistle on downward movement of the sleeve beyond a predetermined point.

4. An alarm for pneumatic tires comprised of a housing adapted to be secured to the valve stem of a pneumatic tire, a movable member dividing the housing into two compartments, means for connecting one compartment with the air tube to make the air pressure equal to the pressure in the tube, means to equalize the pressure in both compartments whenever the pressure in the compartment connected with the air tube becomes greater than in the other compartment, and means to sound an alarm for an appreciable length of time when the pressure in said tube connected compartment becomes less than in the other compartment, substantially as described.

In testimony whereof I affix my signature in presence of two witnesses.

CHARLES E. JOHNSON.

Witnesses:
  FRANK E. LIVERANCE, Jr.,
  H. H. YARRINGTON.